Oct. 17, 1950 — P. H. LA BURTHE ET AL — 2,526,241
ELECTRODE SEAL FOR GLASS FURNACES
Filed May 12, 1948
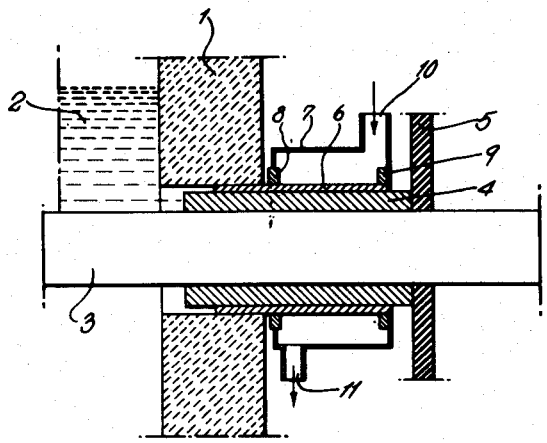
INVENTORS
PIERRE HENRI LABURTHE
ROGER EMILE LAMBERT
BY
Dale A. Bauer
ATTORNEY Patented Oct. 17, 1950

2,526,241

UNITED STATES PATENT OFFICE 2,526,241

ELECTRODE SEAL FOR GLASS FURNACES

Pierre Henri La Burthe and Roger Emile Lambert, Paris, France, assignors to Societe Anonyme des Manufactures des Glaces et Produits Chimiques de Saint-Gobain, Chauny & Cirey, Paris, France Application May 12, 1948, Serial No. 26,514
In France May 21, 1947

2 Claims. (Cl. 13—6)

This invention relates to glass furnaces and to furnaces of other sorts in which materials may be heated by electricity brought into the furnace through an electrode that penetrates the wall of the furnace tank and is in heating relation to the material in the furnace.

In such furnaces, different parts of the electrode are found at different temperatures because the temperature of the bath in which one end of the electrode is plunged is different from the exterior medium in which the other end of the electrode, that to which the current supply lead is attached, is found. Now, it is known that graphite burns in the presence of oxygen at a temperature on the order of 600° C., and it has been found that outside the tank, parts of the graphite electrode are liable to burn if precautions are not taken to exclude air from it.

It is desirable, in order to permit regulation of the power delivered to the bath, to compensate for electrode consumption, to balance the phases, and to facilitate the replacement of consumed or damaged electrodes, that an electrode should be easily moved along its axis.

It is an object of the invention to provide an electrode structure for furnaces that will permit the power admitted to the bath to be varied by changing the position of the electrode.

Another object is to make an electrode structure that can compensate for the consumption of electrode material during the carrying out of the furnace process.

Another object of the invention is to make an electrode structure that can be adjusted to balance the phases in a polyphase system of heating.

Another object is to facilitate the replacement of electrodes consumed or damaged.

A still further object of the invention is to protect the electrode outside of the furnace against combustion and against damage by oxidation.

The objects of the invention are accomplished generally speaking by an electrode structure in which the electrode is mounted for easy axial movement within a piece of material having a coefficient of expansion close to that of the electrode and a low coefficient of friction relative to the electrode material. A particular advantage of the invention lies in its application to glass furnaces wherein the electrodes are made of carbon, and the invention will be accordingly described in its association with that particular problem and that particular type of furnace. In the preferred form of the invention, a carbon bearing is sealed in the furnace wall and a carbon electrode is slidably mounted in it. The electrode securely fits the bearing, which is preferably of graphite. The length of this bearing is sufficient to give adequate support to the electrode in any of its positions. Under some circumstances, the portion of the carbon making contact with the air would be at such a temperature that it would be oxidized, but by directing cooling streams of fluids, for instance, of gas or liquids, upon the exposed portion, its temperature is maintained below that at which oxidation or combustion will take place.

The bearing may be protected and encircled for a part of its length by a sleeve that prevents contact with the air. In that case, the sleeve may be subjected to cooling.

The bearing has the advantage of assembly with the electrode with a minimum of play because it is made of a material having nearly the same coefficient of expansion and little friction. Consequently, it securely fits the electrode at every instant and without regard to the difference in temperature from end to end of the electrode. Furthermore, all risk of seizure is eliminated when the material chosen for the bearing has the same coefficient of expansion as the electrode and changes its size in conformity to temperature.

By cooling the bearing, which is fixed in the wall around the electrode, one eliminates all risk of combustion. For example, one may cover the outside of the bearing with a sleeve in order to exclude air from certain portions or a certain length of the electrode. If the carbon be exposed at that temperature, in that position, the temperature may reach or exceed the temperature at which combustion begins. The sleeve employed may be made of a metal or an alloy. The said metal or alloy sleeve may be used in the form of sheet metal tightly set on the bearing, for instance, by clamping or a friction fit or by hooping. It may also be applied as an envelope mounted on the sleeve, or may consist of electrolytically deposited material. Furthermore, it may be applied by spraying molten (metal particles) or in any other suitable way. Other sleeves made of materials sufficiently resistant to heat and impermeable to air may also be mounted on the bearing, for instance silicates.

The bearing may be cooled in any known way, but it is preferred to cool by circulation of a gaseous fluid, which has the great advantage of permitting the greatest variation in the calories per unit of time extracted from the parts to be attained by the simple expedient of varying the rate of gas flow. In particular, it is possible to reduce this flow and the exchange of heat to very low but still precise values. It is thus possible to regulate the cooling of the bearing so that the outside does not burn but the glass near it on the inside remains hot enough not to congeal and reduce the mobility of the electrode.

In the drawings, the figure is a vertical section through a preferred form of the invention.

In this figure the numeral 1 represents the wall of a glass furnace, and 2 indicates the molten glass retained by the wall. The furnace is of type using Joule effect for heating purposes and an electrode 3 penetrates the wall 1 beneath the level of the glass. This electrode is usually carbon, and frequently graphite.

Our invention contemplates an electrode 3 of precisely uniform size and shape from end to end. This electrode 3 is seated in an encircling member 4 which is called for convenience, a bearing and which has a bearing fit with the outside of the electrode. The bearing is made of a material capable of withstanding the temperature of the bath and having a low coefficient of friction with respect to the electrode. Furthermore, in order to have perfect functioning at all temperatures, the sleeve is chosen with a coefficient of thermal expansion like that of the electrode. If carbon is used for both pieces, this requirement is satisfied.

Encircling the bearing 4 is a sleeve 6, which is preferably of metal or an alloy and which seals the bearing in the wall. In most conditions of operation the bearing desirably extends inward beyond the end of the sleeve. A cooling box 7 with an inlet 10 and outlet 11 is provided about the outwardly extended end of the sleeve 6 and serves to direct a flow of cooling fluid about that part of the electrode, keeping it at any selected temperature. Insulating packing glands 8—9 seal the box about the sleeve.

The bearing is secured to a plate 5, of heat and electrical insulating material, by which its position within the wall of the furnace is set. The position of the plate 5 can be varied to alter the position of the bearing within the wall. Once the electrode has been set in the wall in the bearing 4, it can be moved into the bath through the bearing to any length selected, and adjusted to compensate for loss of surface area and to balance the phases.

In the drawing, the bearing is shown withdrawn from the inner wall of the tank, but the position chosen will be such that the bath, which cools on contact with the tank wall, will remain fluid near the electrode so as to permit easy movement of the electrode.

If the bearing itself is used up or damaged another may be slid over the electrode, behind the first, and advanced until it has replaced the first, which is then thrust forward and allowed to drop into the bath from which it may be removed.

Other and auxiliary cooling means can be employed for the sleeve and the bearing. For instance, they may be provided with cooling fins to increase the cooling surface.

The principles of the invention are applicable to every situation in which an electrode is employed at a temperature at which it is liable to oxidation or combustion on contact with air. It is particularly suited to the protection in processes in which carbon electrodes are employed at such high temperatures. The contents of the furnace are not a limitation, although the glass making art is particularly benefitted, because the important consideration within the furnace is its temperature at the electrode, not the substance about the electrode. The electrode can be vertical, horizontal, or at any other angle. When employed in a glass furnace the invention maintains the fluidity of the glass inside the tank about the electrode and the temperature of the electrode outside the tank so that it is not damaged by oxidation. The general principles of the invention also involve the use of a bearing having a coefficient of expansion like that of the electrode employed, and the use of bearings and electrodes of low relative friction.

This structure contributes markedly to extend continuity of use, because furnaces need not be shut down for the replacement of electrodes or electrode structures. It contributes to perfection of operation because it permits the submerged parts of the electrodes to be varied to obtain the most perfect balance in the phases of a polyphase current, and to compensate for wear of, or damage to, an electrode. Other advantages will be apparent to persons skilled in the art of electric furnaces, such as the regulation of the power delivered to the bath.

As many apparently widely different embodiments of the present invention may be made without departing from the spirit and scope thereof, it is to be understood that the invention is not limited to the specific embodiments, except as defined in the appended claims.

What is claimed is:

1. A glass furnace heated by carbon electrodes and Joule effect having a furnace wall, a carbon electrode penetrating the wall beneath the glass level and having a part submerged in the glass and another part outside the wall, a bearing in the wall constituted by a single block of carbon in encircling contact with the electrode and constituting the sole support in the wall for the electrode, a metal sleeve sealed in the wall about the bearing in encircling contact with said bearing and extending outside the wall, and a cooling box outside the wall encircling the outside part of the metal sleeve and having ports for the admission and discharge of cooling fluid.

2. A glass furnace heated by carbon electrodes and Joule effect having a furnace wall, a carbon electrode penetrating the wall beneath the glass level and having a part submerged in the glass and another part outside the wall, a bearing in the wall constituted by a single block of carbon in encircling contact with the electrode and constituting the sole support in the wall therefor, a metal sleeve sealed in the wall about the bearing in encircling contact with said bearing and extending outside the wall, and cooling means outside the wall constructed and arranged in heat-exchanging relation to the externally exposed parts of the metal sleeve and the electrode.

PIERRE HENRI LA BURTHE.
ROGER EMILE LAMBERT.

REFERENCES CITED

The following references are of record in the file of this patent:

UNITED STATES PATENTS

| Number | Name | Date |
|---|---|---|
| 469,454 | Rogers | Feb. 23, 1892 |
| 573,041 | Schindler | Dec. 15, 1896 |
| 601,366 | Wilson et al. | Mar. 29, 1898 |
| 760,057 | Cowles | May 17, 1904 |
| 836,155 | Tone | Nov. 20, 1906 |
| 871,338 | Heroult | Nov. 19, 1907 |
| 908,407 | Heroult | Dec. 29, 1908 |
| 1,201,224 | Gillett et al. | Oct. 10, 1916 |
| 1,267,317 | Erskine | May 21, 1918 |
| 1,332,795 | Booth | Mar. 2, 1920 |
| 1,417,303 | Nolly | May 23, 1922 |
| 1,542,716 | Payne | June 16, 1925 |
| 1,637,052 | Robinson | July 26, 1927 |
| 1,820,248 | Raeder | Aug. 25, 1931 |
| 1,889,516 | McIntosh | Nov. 29, 1932 |
| 1,897,973 | Wadman | Feb. 14, 1933 |
| 1,905,534 | Wadman | Apr. 25, 1933 |
| 2,061,090 | Rhoads | Nov. 17, 1936 |
| 2,122,469 | Hitner | July 5, 1938 |
| 2,159,361 | Atkinson et al. | May 23, 1939 |
| 2,209,515 | Ehman et al. | July 30, 1940 |
| 2,215,982 | Slayter et al. | Sept. 24, 1940 |
| 2,243,096 | Hardin | May 27, 1941 |
| 2,244,267 | Slayter et al. | June 3, 1941 |
| 2,250,155 | Ferguson | July 22, 1941 |
| 2,405,236 | Rhoades et al. | Aug. 6, 1946 |

FOREIGN PATENTS

| Number | Country | Date |
|---|---|---|
| 383,608 | Great Britain | Feb. 10, 1931 |